United States Patent Office 3,287,345
Patented Nov. 22, 1966

3,287,345
NON-ABSORPTIVE FIBROUS CARRIER WITH UREA AND ITS USE IN SEPARATION OF HYDROCARBONS
Charles H. Middlebrooks and Earle C. Makin, Jr., St. Louis, Mo., assignors to Monsanto Company, a corporation of Delaware
No Drawing. Filed Mar. 12, 1964, Ser. No. 351,528
12 Claims. (Cl. 260—96.5)

This application is a continuation-in-part of Serial No. 90,221, filed February 20, 1961, which application is in turn a continuation of Serial No. 722,119, filed March 18, 1958 and Serial No. 722,131, filed March 18, 1958, all now abandoned.

This invention relates to the separation of organic compounds. More particularly, it relates to improvements in the process for separating organic compounds from mixtures thereof through the use of urea and thiourea as complex-forming agents.

Processes for the separation of organic compounds by means of the complex-forming agents urea and thiourea are well-known in the art. These processes permit the separation of a class of compounds having one type of molecular arrangement from a class of compounds having a different type of molecular arrangement. For example, straight chain hydrocarbons can be separated, individually or as a class, from branched chain and/or cyclic hydrocarbons. In such as process, urea is used to form an adduct with the organic compounds having straight carbon atom chains. Urea does not form an adduct with branched chain or cyclic organic compounds. Through the formation of these adducts, separation can be accomplished. Similarly straight chain hydrocarbons can readily be separated from cyclic hydrocarbons, such as benzene, toluene or the cyclic paraffins. In this case the cyclic hydrocarbons do not form adducts with urea and consequently the straight chain hydrocarbons can be separated by means of the adducts which they form with urea.

While urea forms adducts with organic compounds having straight carbon atom chains, thiourea forms adducts with organic compounds having branched carbon atom chains. This peculiar adduct forming property of thiourea permits a separation of such branched chain organic compounds from organism compounds having straight carbon atom chains, since the latter do not form adducts with thiourea.

Various methods have been used for contacting thiourea or urea with a mixture of organic compounds to be separated. Fluid processes are known wherein a solution of urea or thiourea is contacted with the mixture of organic compounds. Moving bed processes have also been suggested wherein solid urea or thiourea moves countercurrent to the mixture of organic compounds to be separated. It has also been proposed to bring the mixture of organic compounds to be separated into contact with urea or thiourea admixed with a solid adsorptive material such as clay, silica gel, bauxite and so forth, or non-adsorptive materials such as sand, kieselguhr and so forth.

After the adduct has been formed, many different techniques can be employed for the separation of the adduct, recovery of the adducted hydrocarbon and recovery of the urea or thiourea used in the adduction process. These techniques encompass simple distillation, steam distillation, use of a solvent for the complex-forming agent, heating or application of a solvent for a particular fraction of the regenerated organic compounds.

While a considerable technology has been developed over the past years on the use of urea and thiourea as complexing agents for the separation of organic compounds, there is considerable area for improvement particularly as to the commercial application of such a process. From a commercial standpoint, the most critical aspect of these processes lies in the method used to contact the organic compounds with thiourea or urea to form the adduct. The fluid processes mentioned in the art require expensive and extensive purification and recovery techniques. The moving bed processes frequently result in plugging of the equipment. The use of urea or thiourea on a solid adsorptive or non-adsorptive carrier as proposed in the prior art results in significant losses of urea and thiourea due to the difficulty of retaining the complexing agents on the carriers used.

It is an object of this invention to provide an improved separation of organic compounds.

It is another object of this invention to provide an improved process for the separation of organic compounds through the use of an amide complex-forming agent selected from the group consisting of urea and thiourea.

It is another object of this invention to provide an amide complex-forming bed from urea or thiourea deposited on and throughout a fibrous aluminum silicate or fibrous glass carrier.

It is another object of this invention to provide an improved method for the separation of organic compounds having a straight chain of carbon atoms from organic compounds having a branched chain of carbon atoms and/or cyclic organic compounds by the formation of adducts of the organic compounds having a straight chain of carbon atoms with urea.

It is another object of this invention to provide an improved method for the separation of organic compounds having a branched or cyclic chain of carbon atoms from organic compounds having a straight chain of carbon atoms by the formation of adducts of the organic compounds having a branched or cyclic chain of carbon atoms with thiourea.

It is another object of the present invention to provide an improved method for the preparation of amide complex forming beds from urea or thiourea.

Additional objects of this invention will become apparent from a discussion of the invention.

It has now been discovered that the process for separating a mixture of organic compounds by contacting said mixture with an amide selected from the group consisting of urea and thiourea to form a solid adduct with a portion of the compounds contained in said mixture, can be significantly improved by effecting the contact between said mixture and said amide by passing the liquid mixture of organic compounds through a bed of the solid amide dispersed throughout an inert, non-absorptive, non-porous, fibrous carrier selected from the group consisting of fibrous aluminum silicate and fibrous glass.

The novel fibrous carriers used in the process of this invention afford a number of advantages. Changes in volume occurring when the amide is adducted with the organic compounds may take place without appreciably disturbing the distribution of the amide in the bed. The insert, non-absorptive, non-porous, fibrous carriers of the present invention prevent the amide from caking during the adduction step and allow ready washing of the unreacted organic materials from the adducted materials thereby assuring a much higher purity of the separated material. This invention results in a much simpler semi-continuous process than the systems heretofore described in the literature. The novel process of this invention can be still further improved if, in conjunction with the adduction step heretofore described, the adduct is decomposed and the adducted material regenerated by means of a liquid hydrocarbon at an elevated temperature, which hydrocarbon is characterized by being a non-solvent for the amide used in the adduction step. Such a regeneration step does not disturb the amide bed and the entire process can then be carried out without the necessity for recovering and reforming the amide bed between treatments of the organic material to be resolved.

The inert, non-absorptive, non-porous, fibrous carrier materials used to prepare the amide beds in accordance with the present invention are fibrous glass and fibrous aluminum silicate. These carriers are inert to and insoluble in the organic materials to be resolved, the wash liquors and the regenerating materials used in the process. Also, these carriers have sufficient free space to compensate for the expansion of the amide during the adduct-forming step. Further, being non-absorptive and non-porous, these carriers do not retain any of the liquids passed into contact therewith by entrapment in pores or absorption of the surface. A particular advantage of the carriers of the present invention is found in their random alignment of fibers. Because of this random alignment of fibers, greater free space is obtained and greater utilization of the surface area of the carrier results. Also, there is less retention or holdup of liquid materials during removal of the liquids. Further, on wetting or packing, the randomized alignment of the fibers maintains the above advantages whereas fibrous materials, such as asbestos fibers, having substantially parallel alignment of fibers become virtually a solid mass with little or no free space sufficient for adduction remaining.

The inert, non-absorptive, non-porous, fibrous carriers disclosed herein can be impregnated with the amide by any method well known to those skilled in the art. This can be accomplished by a mechanical mixing of the carrier with the amide in a suitable liquid medium after which the liquid medium is removed by vaporization or the fibrous carrier can be impregnated with a concentrated solution of the amide and the amide precipitated on the carrier by passing a material through the bed which is a non-solvent for the amide but miscible with the solvent for the amide. The concentration of the amide in the bed can be substantially varied. An amide concentration, based upon total weight of the bed, in the range of from as low as 10 percent to about 90 percent has been found to be applicable.

Though as above noted, any method of preparing an amide complex forming bed with the novel fibrous carriers of the present invention may be utilized, a particularly useful and novel method of preparing the bed comprises totally immersing the carrier in an aqueous solution of amide and while said fibrous carrier remains totally immersed in said solution a hydrocarbon material capable of forming an adduct with said amide is intimately commingled with said aqueous solution thereby forming an adduct with said amide, which adduct precipitates from said solution on to said fibrous carrier thereby uniformly dispersing the amide on the carrier. This method of preparation has several advantages. Primarily it provides for a high and uniform dispersal of the amide on the carrier and in turn allows greater utility of the dispersed urea. Another advantage is in the lack of necessity for high temperatures to precipitate the amide by evaporation of the solvent or low temperatures to precipitate the amide from the solution without evaporation. In either of these methods the amide is less uniformly dispersed than when using the above described useful method.

The organic compounds that form adducts with urea are many and varied. In the practice of the process of this invention, it has been found that a straight-chain organic compound having a straight aliphatic carbon atom chain containing from six to fifty carbon atoms therein will form adducts with urea in preference to branched-chain or cyclic organic compounds. The straight-chain organic compounds can be unsubstituted hydrocarbons as well as hydrocarbons containing substituent groups attached to one of the two end carbon atoms of the carbon chain. Thus, one or more of such straight-chain hydrocarbons as the paraffinic hydrocarbons containing from six to fifty carbon atoms, for example, hexane, heptane, octane, nonane, decane, undecane, dodecane, tridecane, tetradecane, pentadecane, hexadecane, heptadecane, nonadecane, eicosane, docosane and progressively higher molecular weight straight-chain paraffins up to and including pentacontane; and the straight-chain olefins containing from six to fifty carbon atoms, for example, hexenes, heptenes, octenes, nonenes, decenes, undecenes, dodecenes, tridocenes, tetradecenes, pentadecenes, hexadecenes, heptadecenes, nonadecenes, eicosenes, heneicosenes, docosenes, and progressively higher molecular weight straight-chain olefins up to and including the pentacontenes, form adducts with urea, and accordingly, they can be readily separated from branched-chain or cyclic hydrocarbons that do not form adducts with urea. Similarly, the corresponding diolefinic hydrocarbons of the above-named compounds form adducts with urea provided the hydrocarbons contain an unbranched chain of from six to fifty carbon atoms. Additionally, many derivatives of these saturated and unsaturated hydrocarbons form adducts with urea. For example, hydroxy, amino, mercaptan, and halide derivatives of these hydrocarbons form adducts with urea. Also, various ketone and ester derivatives of these hydrocarbons react similarly. Ordinarily, the various substituent groups set forth above are attached to one of the two end carbon atoms in the unbranched carbon chain of six to fifty carbon atoms. However, when fluoride atoms are attached to the carbon chain they act similar to hydrogen atoms, and, when attached to any of the carbon atoms in the unbranched chain, they do not inhibit the formation of adducts with urea. The primary characteristic of these organic compounds is the unbranched chain of from six to fifty carbon atoms.

On the other hand, organic compounds containing a branched chain of carbon atoms form adducts with thiourea, and in accordance with this property they are readily separable from organic compounds containing a straight chain of carbon atoms. Thus, with thiourea branched chain hydrocarbons containing from three to fifty carbon atoms in the straight carbon atom chain portion of the molecule and also having one or more alkyl substituents therein ranging from one to twenty carbon atoms in length, for example, methyl propane, the methyl butanes, dimethyl butane, the methyl pentanes, the ethyl pentanes, trimethyl pentane, diethyl pentane, the methyl hexanes, di-, tri-, and tetramethyl hexane, the ethyl hexanes, di-, tri-, and tetraethyl hexane, ethyl heptane and other alkyl paraffins, as well as methyl propene, the methyl butenes, di-, tri-, and tetramethyl butenes, the methyl pentenes, the ethyl pentenes, trimethyl pentenes, diethyl pentene and other branched-chain olefins including higher molecular weight olefins, for example, methyl, ethyl, propyl and butyl derivatives of hexadecene, docosene and pentacontene, will form adducts with thiourea. Also, the corresponding branched chain diolefinic hydrocarbons react similarly. Furthermore, these branched chain compounds may have attached either to the straight chain or the branched chain of carbon atoms any one of the substituent groups set forth above in the discussion of compounds that form adducts with urea. The primary charateristic of these compounds is the branched chain of carbon atoms.

Various alicyclic-type organic compounds form adducts with thiourea. For example, cycloparaffins, such as cyclopentane, cyclohexane, methylcyclopentane, methylcyclohexane, di- and trimethylcyclopentane, and the like, and the corresponding unsaturated hydrocarbons form adducts with thiourea. Also, methane has been found to form such adducts with thiourea, as well as oxygenated derivatives of terpenes, such as camphor, borneol, fenchone, and the like. It is within the scope of this invention to separate mixtures of organic compounds containing any of the compounds described above, and it is also within the scope of this invention to decompose adducts of the above-described organic compounds and either urea or thiourea.

The urea adducts that are formed in accordance with this invention contain more than three mols of urea per mol of organic compounds, and the thiourea adducts contain more than two mols of thiourea per mol of organic compounds.

The adducts of the amide and the organic compounds disclosed above are formed at a temperature below the decomposition temperature of the adducts. In general, this temperature is below 175° F., and room temperatures, about 60° to 80° F., is preferred.

Although a solvent for the amide is not always essential in the practice of the process of this invention, it is preferred to employ sufficient amounts of solvent to at least wet the amide without forming a separate, filterable, liquid phase. Ordinarily, the amide contains no more than 15 percent by weight of the solvent, and usually from about 5–10 percent is sufficient. In many cases even a smaller amount of solvent can be utilized with satisfactory results. Suitable solvents, which may also be termed activators or catalysts, are water, methanol, ethanol, propanol, secondary butyl alcohol and various ketones. Various means can be used for wetting the amide with the particular polar solvent utilized. Preferably, in the practice of the process of this invention, a small percentage of the polar solvent is incorporated with the organic material to be resolved. For example, the incorporation of as little as from about 1 to about 2 percent of methanol in the hydrocarbon charge usually supplies the required amount of polar solvent for rapid complex formation between the amide and the hydrocarbon charge.

In the practice of the process of the invention, after the adduction step is complete, the unadducted material is washed from the amide bed by means of a hydrocarbon which is a nonsolvent for the amide used in the adduction step. Following this, the adducts are decomposed to recover the adducted organic material.

In the practice of this invention it has been found preferable to decompose the adducts formed by contacting the adducts with a hydrocarbon at an elevated temperature suitable for decomposing the adducts. The hydrocarbon employed should not form an adduct with the amide at the conditions prevailing in the bed. To decompose adducts of urea and straight-chain organic compounds, straight-chain hydrocarbons may be employed provided the decomposition temperature of the adducts of those hydrocarbons and urea is below the temperature in the bed. For example, n-hexane can be used to decompose adducts of urea and higher boiling hydrocarbons, such as n-octane, n-nonane, n-decane, and the like, if the temperature in the bed is at least as high as the decomposition temperature of the adducts of urea and n-hexane. Similarly, low-boiling straight-chain hydrocarbons, such as propane, butane, and mixtures thereof, can be used since these hydrocarbons do not form adducts with urea. Also, isoparaffinic hydrocarbons are suitable for the decomposition of urea adducts, and the specific isoparaffinic hydrocarbons named above are illustrative of those that may be used. Also, if desired, cycloparaffinic hydrocarbons, such as cyclopentane, cyclohexane, and the like can be employed to decompose urea adducts.

To decompose adducts of thiourea and branched-chain organic compounds, branched-chain hydrocarbons may be employed, provided the decomposition temperature of the adducts of those hydrocarbons and thiourea is below the temperature in the bed. For example, isohexane can be used to decompose adducts of thiourea and higher boiling hydrocarbons, such as isooctane, isononane, isodecane, and the like, if the temperature in the bed is at least as high as the decomposition temperature of adducts of thiourea and isohexane. Similarly, straight-chain hydrocarbons, which are exemplified by those straight-chain hydrocarbons named above, can be used to decompose thiourea adducts since those hydrocarbons do not form adducts with thiourea.

The hydrocarbon employed to dissociate adducts of either urea or thiourea and organic compounds should be readily separable by fractional distillation and differing boiling points are therefor required between the liquid hydrocarbon employed and the organic compound of the adduct. For that reason it is usually desirable to employ relatively low boiling hydrocarbons, such as pentane, butane, propane, and the like to effect the decomposition since those hydrocarbons are readily separable from the organic compound of the adduct after the adduct has been decomposed.

It has been found particularly suitable to effect the decomposition of the adduct by passing the hydrocarbon utilized for the decomposition downward in the vapor state through the bed of the adduct. The hydrocarbon and the organic compound from the adduct are condensed and withdrawn from the bottom portion of the column, recovered and then separated by distillation. The decomposition of the adduct is effected at a temperature above the temperature of the adduct forming reaction. The decomposition temperature employed is dependent upon the organic compound in the adduct since, in general the adduct decomposition temperature is dependent upon the number of carbon atoms in or the molecular weight of the organic compound in the adduct. For all practical purposes temperatures within the range of 120° to 260° F. are suitable for the decomposition of the adduct.

The following examples are illustrative of the novel process of this invention.

*Example I*

Urea (350 grams) and 70 grams of a fibrous insulating aluminum silicate were thoroughly mixed in a Waring Blendor with sufficient hexane (commercial grade) to yield a workable slurry. The slurry was transferred to a 2″ diameter pipe equipped with a wire support and a fibrous insulating aluminum silicate pad to hold the urea bed in place. The hexane was evaporated off the bed with a stream of nitrogen.

To 250 grams of caustic washed refinery kerosene having a refractive index at 20° C. of 1.4499 and a boiling point of 165° C. to 275° C., was added 40 grams of methanol as a developer. The mixture was percolated through the urea bed at room temperature. Unadducted kerosene was then removed from the bed by washing with 350 ml. portions of commercial hexane. The urea adduct was dissociated by introducing vaporized isooctane into the bed and collecting the condensed isooctane and normal paraffins from the bottom of the column. Subsequent removal of the isooctane by simple distillation yielded 25 grams of n-alkane having a refractive index at 20° C. of 1.4240 and analyzing greater than 90 percent by weight of n-paraffins by infrared analysis. The recovery was equivalent to 10 percent by weight of the kerosene charged.

*Example II*

A mixture of 100 grams of water and 302 grams of urea were heated to 90° C. and the resulting solution was poured over a bed of 30 grams of a fibrous insulating aluminum silicate contained in a 2″ diameter glass pipe. The solution was allowed to cool and excess urea solution was drained off. Isopropanol (220 ml.) was percolated through the bed to remove water and simultaneously precipitate out the bulk of the urea contained in the aqueous phase of the material. The precipitated urea was intimately dispersed throughout the bed. The pressure drop of this bed was 433 mm./ft. of packed height. It has a composition of 87 percent by weight of urea and 13 percent by weight of fibrous insulating aluminum silicate. The bed contained 200 grams of urea dispersed on the carrier.

Caustic washed refinery kerosene (150 grams) having a refractive index at 20° C. of 1.4499 and a boiling range of 165 to 275° C. containing 25 ml. of isopropanol and 1 ml. of water as developer was passed through the bed at 25° C.

Commercial hexane (500 ml.) was percolated through the bed at room temperature to remove unreacted kerosene. The adduct was dissociated with isooctane at 80° C. Subsequent removal of isooctane from the n-alkanes yielded 25.5 grams of paraffin concentrate with a refractive index at 20° C. of 1.4258. Infrared analysis indicated the paraffin concentrate to contain greater than 90 percent n-paraffins. The yield was equivalent to 17.0 weight percent of the kerosene charged.

In both Examples I and II, the urea beds were undisturbed by the adduction and regeneration steps of the process and urea losses were insignificant. The beds were used for approximately twenty successive separations without reforming the bed and without loss in resolution efficiency.

Example III

A 2" x 24" glass column was packed with 47.5 grams of fibrous, non-porous, fiber glass to form a 10" bed of fiber glass. To this column was added a mixture of 428 grams of urea in 264 grams of water at a temperature of 80° C. The urea was precipitated throughout the bed by rapidly cooling the column by passing water at 25° C. over the outside for 30 minutes. The column was allowed to stand overnight at room temperature and then the liquid was drained off. The column was washed with a 200 ml. and a 100 ml. portion of isopropanol and dried with a stream of nitrogen. The bed contained 104 grams of urea.

One hundred forty grams of kerosene containing 14 grams of methanol were passed through the bed. The heat of adduction was removed by adding 100 ml. of isoheptane to the bed and recirculating the isoheptane through a heat exchanger until the heat was removed. The unadducted kerosene adhering to the urea adduct was removed by washing the bed with 400 ml. of isoheptane at room temperature.

The urea adduct formed with the normal paraffins in the kerosene was then dissociated by passing 400 ml. of isoheptane through the bed at its boiling point of about 95° C. The isoheptane solution of n-paraffins recovered from the dissociated adduct was distilled and the end paraffin fraction was recovered. The recovery was equivalent to 88.5 percent of the n-paraffin content of the kerosene.

The above three examples illustrate the present invention wherein the novel carriers disclosed herein are used in the preparation of amide complexing beds. Also, these examples illustrate the different methods of impregnating the novel carriers of the present invention with amide complexing agents.

The following two examples are presented to illustrate the advantages obtained by using the novel carriers of the present invention.

Example IV

A 2" x 24" glass column was packed with 47.5 grams of porous vermiculite particles to form a 10" bed of vermiculite. A second similar glass column was similarly packed with 47.5 grams of fibrous, non-porous, fiber glass to form a 10" bed of fiber glass. To each column was added a mixture of 428 grams of urea in 264 grams of water maintained at a temperature of 80° C. The urea was precipitated throughout each bed by rapidly cooling the columns by flowing water at approximately 25° C. over the outside of each column for 30 minutes. The columns were allowed to stand overnight at room temperature and then the liquid drained from each. Each column was washed with a 200 ml. and a 100 ml. portion of isopropanol saturated with urea and then dried with a stream of nitrogen. The vermiculite bed contained 151 grams of urea and the non-porous fiber glass bed contained only 104 grams of urea.

One hundred and forty grams of kerosene containing 14 grams of methanol was passed through each bed. The heat of adduction was removed by adding 100 ml. of isoheptane to each bed and recirculating through a heat exchanger until the heat was removed.

The unadducted kerosene adhering to the urea adduct was substantially removed by washing each bed with 400 ml. of isoheptane at room temperature.

The urea adduct formed with the normal paraffins in the kerosene was then dissociated by passing 400 ml. of isoheptane through the bed at its boiling point of about 95° C. The isoheptane solution of n-paraffins recovered from the dissociated urea adduct was distilled and the n-paraffin fraction recovered.

The comparative results obtained were as follows:

| | Vermiculite Column | Fiber Glass Column |
|---|---|---|
| n-Paraffin content of n-paraffin fraction (wt. percent) | 81.1 | 88.5 |
| Wt. percent of available n-paraffins in kerosene charge recovered | 53.8 | 52.3 |
| Wt. ratio of urea:n-paraffin recovered | 10.8:1 | 7.7:1 |
| Wt. percent of available urea utilized on a theoretical basis of an adduction ratio of urea:n-paraffin of approximately 3:1 | 27.7 | 39.1 |

Comparison of these results is believed to make apparent the advantages of the novel carriers of the present invention. Because of the lack of holdup and absorption of non-adducting materials, a significantly purer n-paraffin fraction was obtained with the fibrous glass. Also, the carrier of the present invention allowed greater utilization of the urea dispersed on the carrier thus providing for a significant reduction in the amount of urea necessary to produce a particular separation.

Example V

A 2" x 24" glass pipe was packed with 47.5 grams of rolled insulating Owens-Corning "Fiberglas" to a depth of 9½". This amount formed a roll that could just be forced into the pipe and was compact enough that it would not shift. A rubber stopper was then placed in the end of the pipe next to the fiber glass and kerosene was added until the fiber glass was thoroughly saturated. Kerosene was forced into the spaces about the fibers by alternately applying and releasing vacuum to the upper end of the pipe. It required 465 ml. kerosene to saturate the bed. The kerosene was then drained by inverting the pipe and removing the rubber stopper. After 1 hour, 255 ml. of kerosene had drained out. After 1½ hours 260 ml. had drained out.

A second pipe was packed with 47.5 grams Baker's long fiber asbestos, acid washed, lot number 22548. This packed to a depth of 5½ inches upon jarring the pipe. These fibers were much looser and easier to shift than the fiber glass. Kerosene was then placed in the column in the same manner as with the fiber glass. Two hundred twenty-five ml. of kerosene were required to saturate the fiber glass. On draining, 40 ml. of kerosene were recovered after one hour and 45 ml. after 1½ hours.

The fiber glass occupied a volume of 490 cc. for a density of 0.097 gm./cc. and had a free space of 465 out of 491 or 94.5 percent. Two hundred fifty-five out of 455 ml. or 55 percent of the kerosene drained out.

The asbestos occupied a volume of 252 ml. and had a density of 0.188 gm./cc. It had a free space of 225 out of 252 or 89.3 percent. Forty out of 225 ml. or 17.8 percent of the kerosene drained out.

From this comparison, it is apparent that greater free space is obtained with the carriers of the present invention which is desirable in that it allows for expansion of the amide on adduct formation. Also, greater free space allows freer movement of liquids through the complexing beds and significantly reduces the holdup in the column on draining. This latter feature is quite apparent from comparison of the amounts of kerosene draining from the two beds at the same time intervals.

The above two examples illustrate the significance of the present invention rather dramatically. In the first of these two examples, Example IV, a fibrous carrier of the present invention is compared with a granular vermiculite. The superiority of the present carriers over the granular porous carriers illustrated by the vermiculite is believed apparent, as above discussed. In the second of the examples, Example V, a fibrous carrier of the present invention is compared with another fibrous carrier not within the present invention. Again, the superiority of the present fibrous carrier is believed apparent.

*Example VI*

A mixture of 100 parts of water and 302 parts of urea are heated to 90° C. and the resulting solution poured over a bed of 30 parts of a fibrous insulating aluminum silicate contained in a 2" diameter glass pipe. The solution is allowed to cool and excess urea solution drained off.

n-Decane (150 parts) containing 20 parts of isopropanol and 1 part of water as developer is passed through the bed at 25° C. to form a solid adduct of urea and n-decane which is precipitated and dispersed throughout the bed.

The adduct thus formed is then dissociated by passing isooctane at 80° C. through the bed thereby removing the n-decane and leaving the solid urea substantially permanently affixed to and dispersed throughout the bed.

*Example VII*

A mixture of 120 parts of water and 320 parts of urea are heated to approximately 90° C. and the resulting solution poured over a bed of 45 parts of a fibrous aluminum silicate contained in a 2" diameter glass pipe. The solution is allowed to cool to approximately 25° C. and without draining any of the solution off, approximately 100 parts of n-decane is introduced into the column and intimately commingled with the urea solution. As the urea-n-decane adduct forms, it precipitates from the solution onto the fibrous aluminum silicate in a uniform dispersion thereof. After precipitation is complete, the excess liquids are drained off. The precipitated adduct thus formed is then dissociated by passing isooctane at 80° C. through the bed thereby removing the n-decane and leaving the solid urea substantially permanently affixed to and dispersed throughout the bed.

The above two examples, Example VI and Example VII, illustrate two modes of preparing the complex forming beds of the present invention through the use of the preferred method of preparation. In Example VI the amide is precipitated onto the carrier by means of first draining off excess solution and then passing an adduct forming material into contact with the amide containing solution dispersed upon and within the fibrous carrier. In Example VII this method is slightly modified to the extent that the excess solution is not drained from the column prior to passing the complex forming material into contact with the amide containing solution. Either of these two methods may be utilized for preparing an amide complexing bed according to the preferred technique disclosed and described herein. Both of these methods are similar to the extent that the amide is uniformly dispersed upon the fibrous carrier by precipitation of the amide in the form of an amide-hydrocarbon complex.

The concentration of the urea of thiourea in the solution used to impregnate the carrier can be varied substantially and will depend to a large extent on the solubility of urea or thiourea therein at the impregnation temperature employed. The lower limit of concentration is governed solely by economics. The upper limit of concentration is governed by solubility and temperature. While supersaturated solutions can be used, saturated solutions or concentrations just below the saturation level at the temperatures employed are preferred.

The temperature of impregnation of the bed can also be varied and is not a critical factor. Best results are obtained by using elevated temperatures during the impregnation with the amide solution. Temperatures above the melting points of the amide being used should be avoided namely, 132° C. in the case of urea and 180° C. in the case of thiourea.

The amount of impregnating solution of amide employed is governed by the concentration of the amide in the solution and concentration of amide desired in the resultant bed. An amide concentration, based upon total weight of the bed, in the range of from as low as 10 percent to about 90 percent has been found to be applicable.

The mechanics of impregnation of the bed with the solution of the amide can be varied to fit the particular production facilities desired. Preferably the solution of the amide is percolated through the inert carrier until the carrier is saturated with the solution.

After the bed has been impregnated with the solution of the amide, the amide is adducted with a suitable material to form an adduct that is at least partially insoluble in said solvent.

What is claimed is:

1. A process for preparing a bed of a carrier material having dispersed therethrough a solid amide which comprises immersing a bed of an inert solid non-porous, non-absorptive carrier selected from the group consisting of fibrous aluminum silicate and fibrous glass with a liquid solvent solution of an amide selected from the group consisting of urea and thiourea, introducing into admixture with said liquid solvent solution of said amide while said bed is immersed therein a liquid capable of forming a solid adduct with said amide which liquid is at least partially insoluble in said solvent, thereby uniformly dispersing an adduct of said amide and said liquid capable of forming a solid adduct with said amide throughout said bed, removing said solvent and any excess liquid capable of forming an adduct and then decomposing said adduct in situ, and removing the released adduct forming material, thereby uniformly dispersing said solid amide throughout said bed.

2. A process as described in claim 1 wherein the liquid solvent solution of said amide is a substantially saturated solution.

3. A process as described in claim 1 wherein said amide is urea.

4. A process as described in claim 1 wherein said amide is thiourea.

5. An amide complexing bed comprised of an inert solid, non-porous, non-absorptive carrier selected from the group consisting of fibrous aluminum silicate and fibrous glass having uniformly dispersed therethrough a solid amide selected from the group consisting of urea and thiourea.

6. An amide complexing bed as described in claim 5 wherein said amide is urea.

7. An amide complexing bed as described in claim 5 wherein said amide is thiourea.

8. A process for separating a mixture of organic compounds comprising passing a mixture of said organic compounds through a complexing bed of a solid amide selected from the group consisting of urea and thiourea dispersed on and throughout an inert, non-absorptive, non-porous, fibrous carrier selected from the group consisting of fibrous aluminum silicate and fibrous glass, and thereafter recovering an organic compound from the complexing bed.

9. A process for separating a mixture of organic compounds having straight carbon atom chains and organic compounds having branched carbon atom chains comprising passing a mixture of said organic compounds through a complexing bed of a solid amide selected from the group consisting of urea and thiourea dispersed on and throughout an inert, non-absorptive, non-porous, fibrous carrier selected from the group consisting of fibrous aluminum silicate and fibrous glass and thereafter recovering an organic compound from the complexing bed by decomposing the solid amide adduct by passing through the bed a hydrocarbon at a temperature sufficiently high to decompose the adduct and above the adduct forming temperature of the hydrocarbon.

10. The process as described in claim 9 wherein the hydrodcarbon is employed in the vapor phase.

11. The process as described in claim 9 wherein the amide is urea.

12. The process as described in claim 9 wherein the amide is thiourea.

References Cited by the Examiner

UNITED STATES PATENTS

| | | | |
|---|---|---|---|
| 2,632,002 | 3/1953 | Gross | 260—96.5 |
| 2,676,141 | 4/1954 | Kane et al. | 260—96.5 |
| 2,716,113 | 8/1955 | Axe | 260—96.5 X |
| 2,816,821 | 12/1957 | Weedman | 260—96.5 X |

OTHER REFERENCES

Kirk-Ohtmer: Encyclopedia of Chem. Tech., vol. 2 (1948), pp. 134–42.

Kirk-Ohtmer: Encyclopedia of Chem. Tech., vol. 12 (1954), p. 328.

ALEX MAZEL, *Primary Examiner.*

NICHOLAS S. RIZZO, *Examiner.*

HENRY R. JILES, J. A. NARCAVAGE,
*Assistant Examiners.*